United States Patent

Romanek et al.

[11] Patent Number: 5,485,871
[45] Date of Patent: Jan. 23, 1996

[54] FILLER HEAD FOR A MOTOR VEHICLE FUEL TANK FILING PIPE

[75] Inventors: Christian Romanek, Noailles; Christophe Crepin, Pontoise, both of France

[73] Assignee: Oaul Journee, S.A., Reilly, France

[21] Appl. No.: 479,551

[22] Filed: Jun. 7, 1995

Related U.S. Application Data

[63] Continuation of Ser. No. 311,152, Sep. 23, 1994, abandoned.

[30] Foreign Application Priority Data

Sep. 29, 1993 [FR] France .................................. 93 11579

[51] Int. Cl.$^6$ .................................................. B65D 55/00
[52] U.S. Cl. ........................ 141/312; 141/348; 220/86.2; 220/264
[58] Field of Search ........................... 141/312, 348–350; 220/86.2, 86.3, 262–264; 251/149.2

[56] References Cited

U.S. PATENT DOCUMENTS

| | | | |
|---|---|---|---|
| 2,145,758 | 1/1939 | Fellows et al. | 220/86.3 X |
| 2,801,767 | 8/1957 | Mariani | 220/86.2 |
| 4,625,888 | 12/1986 | Thompson | 220/262 |
| 5,145,081 | 9/1992 | Gravino | 220/86.2 |
| 5,234,122 | 8/1993 | Cherng | 220/86.2 X |

Primary Examiner—J. Casimer Jacyna
Attorney, Agent, or Firm—Morgan & Finnegan

[57] ABSTRACT

A filler head for a motor vehicle fuel tank filling pipe has a bowl-shaped body, the upper face of which includes a filling orifice. A shut-off valve is pivoted to the bowl of the body between a rest position, towards which it is resiliently biassed and in which it closes off the filling orifice, and a withdrawn position in which it lies within the bowl and in which the filling orifice is open. The valve is put into its withdrawn position by a filling nozzle when the latter is introduced into the filling orifice. The filler head has automatic locking means for locking the shut-off valve in its rest or closed position, with these locking means comprising an unlocking control member.

7 Claims, 8 Drawing Sheets

FILLER HEAD FOR A MOTOR VEHICLE FUEL TANK FILING PIPE

This is a continuation of application Ser. No. 08/311,152, filed on Sep. 23, 1994, now abandoned.

FIELD OF THE INVENTION

The present invention relates to a filler head for a filling pipe feeding a fuel tank of a motor vehicle.

BACKGROUND OF THE INVENTION

A filler head (or filling head) of this type is usually in the form of a chamber or hollow body, the upper face of which is open into a part of the bodywork of the vehicle, with the free end of the upwardly directed filling pipe being open into this chamber or hollow body, the arrangement being such that a filling nozzle of a forecourt filling pump can be introduced into the chamber or hollow body so that the fuel tank can be filled. The filling orifice for the filling pipe may be closed or obturated by a removable filler cap, with the exposed face of the filler head being itself, if desired, hidden by a hinged flap or trap set into the outside of the bodywork.

With a view to eliminating the removably filler cap, it has previously been proposed to provide a filler head of the type comprising a bowl-shaped body, the upper face of which has a filling orifice, the filler head having a shut-off valve which is mounted for pivoting movement with respect to the bowl-shaped body between a rest or closed position, towards which it is urged resiliently, and in which it closes (or obturates) the filling orifice, and a withdrawn or open position in which it lies within the bowl of the body, and in which the filling orifice is open. The valve is a flap valve which is moved into its withdrawn position during introduction of the filling nozzle into the filling orifice.

In one known design of this type of filling head, the shut-off valve, which is equipped with a simple return spring for biassing it to the closed or rest position, is not locked in that position; alternatively it is provided with locking means which require positive control to achieve locking; or else the opening of the valve depends on opening of the access flap or trap.

The use of a shut-off valve which has no locking means gives rise to a danger that pollutants may accidentally be introduced into the fuel tank. This is especially the case when, during washing of the vehicle, the access trap and the zone around the filling orifice are washed using a jet of high pressure water or vapour. The pressure employed can be sufficiently high to cause the shut-off valve to open accidentally.

When the shut-off valve is equipped with externally controlled locking means, its locking then depends on positive action being taken by the user. This solution is not entirely satisfactory because the user may forget to lock it.

DISCUSSION OF THE INVENTION

An object of the invention is to overcome the above mentioned drawbacks.

According to the invention, a filler head or filling head of the type defined above, comprising locking means for automatically locking the shut-off valve in its rest position, and comprising an unlocking control member, is characterised in that the shut-off valve is returned elastically into engagement against a seating which is formed around the filling orifice, the locking means comprising at least one locking finger which is mounted for movement between a locking position, towards which it is biassed resiliently, and in which it extends in facing relationship with the portion of the lower face of the flap valve, and an unlocking position in which it is retracted laterally away from the said portion of the lower face of the shut-off valve, and the unlocking control member controls the displacements of the locking finger against the action of the resilient means which bias it.

The solution which is proposed in accordance with this invention thus enables automatic locking of the shut-off valve to be achieved, without intervention by the user, when the filling nozzle is withdrawn. The solution also enables unlocking of the shut-off valve to be obtained before the nozzle is introduced, by the user exerting a positive action. This is independent of any other action, such as for example that necessary to release the access trap or flap in the bodywork which gives access to the filling head.

According to a preferred feature of the invention, the locking finger is arranged in the middle portion of a locking arm, a first end portion of which is articulated with respect to the bowl of the body, about an axis at right angles to the upper face of the bowl which surrounds the lateral edge of the shut-off valve, with the opposite, or second, end portion of the locking arm having a control surface which is adapted for cooperation with a control cam formed on the control member.

According to another preferred feature of the invention, the control member is a control plunger which is mounted for sliding movement in a direction at right angles to the upper face of the bowl, between a high or locking position and a low or unlocking position, while the control cam is formed on a side edge of the control plunger.

The control plunger preferably includes drive means, employing mating cooperation, arranged between the control plunger and the shut-off valve.

Preferably, the drive means comprise a drive rack which cooperates with a drive pinion, the rotation of which is caused by the pivoting movement of the shut-off valve while the latter is being opened.

According to a further preferred feature of the invention, the control plunger is adjacent to the pivot axis of the shut-off valve, the drive pinion is mounted for rotation on the pivot element (e.g. pivot pin) of the shut-off valve, and rotational coupling means are arranged between the drive pinion and the shut-off valve, this coupling means being such as to cause relative angular displacement to take place between these two elements.

According to yet another preferred feature of the invention, the pivot element of the shut-off valve is coupled in rotation to the latter, and includes a radial coupling lug which extends into a recess in the form of a cylindrical sector, which is formed in the drive pinion concentrically with the bore of the latter through which the pivot pin of the shut-off valve passes, and in which the angle that determines the value of the said angular displacement is substantially equal to the angle through which the shut-off valve pivots between its rest position and its withdrawn position, with the rotation of the drive pinion through a value equal to the said angle causing the control plunger to be displaced between its low and high positions.

Preferably, the lower face of the flap valve has an abutment element which is arranged at right angles to the pivot axis of the shut-off valve, with a side face of the said abutment element cooperating with the control surface of the locking arm that carries the locking finger, so as to maintain the latter in an unlocked position when the shut-off valve is in its withdrawn position and the control plunger is in its high position.

According to yet another preferred feature of the invention, the upper face of the bowl is constituted by a cover in which the filling orifice is formed, and which has a passage for the unlocking control member, while the shut-off valve is articulated on the lower face of the cover.

Further features and advantages of the invention will appear more clearly on a reading of the detailed description that follows, which describes a preferred embodiment of the invention with reference to the accompanying drawings.

DESCRIPTION OF A PREFERRED EMBODIMENT OF THE INVENTION

Figure 1:
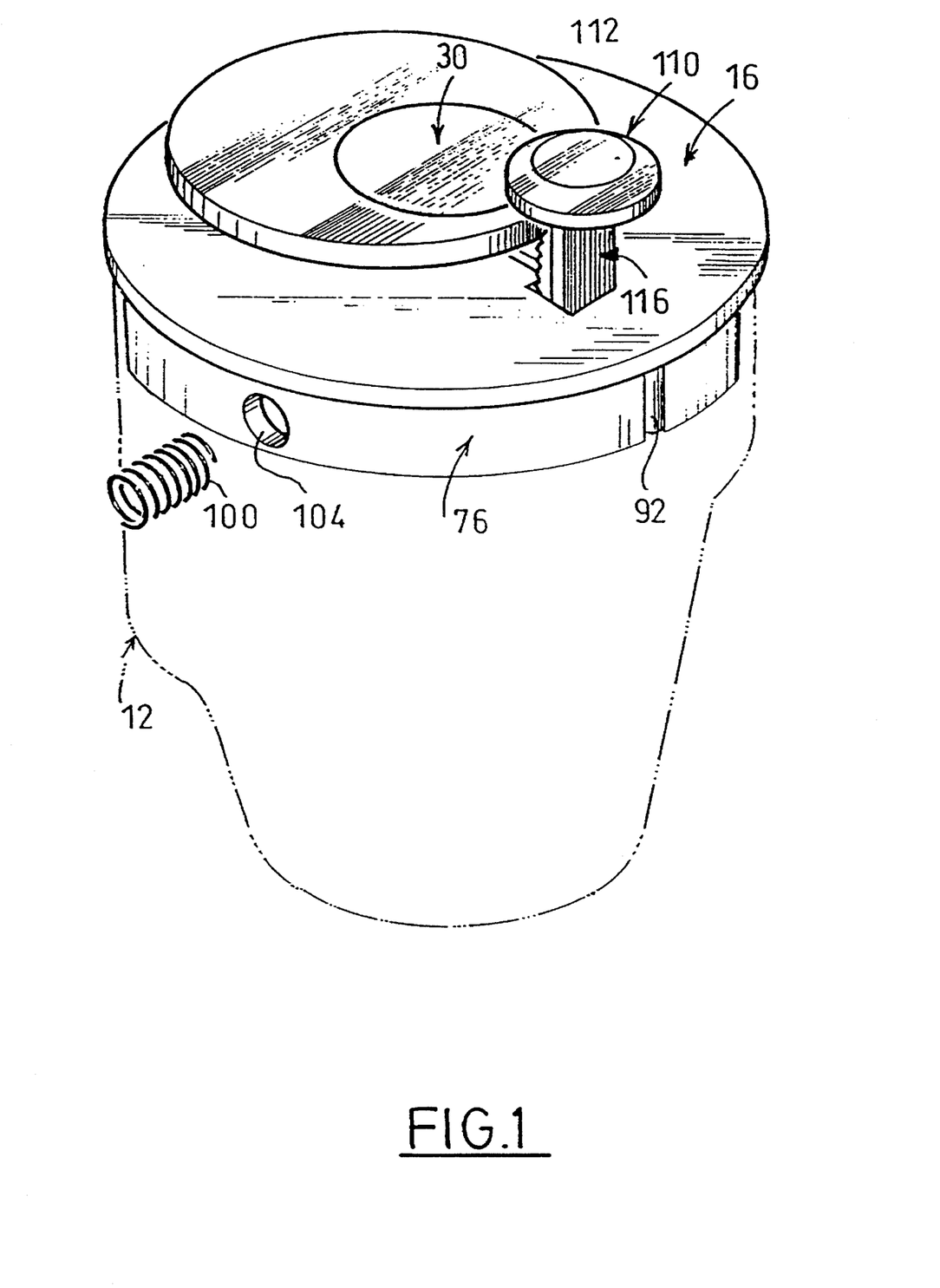
FIG. 1 is a diagrammatic perspective partial view, showing components arranged in the upper part of the filling head made in accordance with the invention.

The filling head 10 shown in the drawings consists essentially of a body in the form of a hollow cylindrical bowl 12. The base of the bowl 12 is formed with an evacuation hole 14 which is arranged to be connected to the upper end of a filling pipe of a motor vehicle fuel tank (not shown). The head 10 has a top cover 16, which is generally in the shape of a disc as shown in FIG. 1. In this embodiment the filling head has a general symmetry about the central vertical plane indicated by the line 2—2 in FIG. 3.

The lower face 18 of the cover 16 bears against a shoulder 20 which is formed in the skirt-shaped side wall 22 of the bowl 12, in the region of the upper part of the latter. The cover 16 is secured (by means not shown) on the upper face of the bowl 12, for example by welding.

The cover 16 has a central filling orifice 24 which is formed with a stepped profile defining a radial abutment shoulder 26 (see FIG. 4) and a conical seal seating 28. The abutment shoulder 26 faces towards the interior of the bowl 12.

The filling head also has a shut-off valve 30, for closing (obturating) the central filling orifice 24. The shut-off valve 30 is in the form of a flap valve. This is pivoted, by means which will be described in greater detail below, below the cover 16 and about a pivot axis XX parallel to the plane of the cover 16. The flap valve 30 has a seal in the form of a toroidal sealing gasket 32, which bears against the seating 28 when in the closed position which is shown in particular in FIG. 2.

Figure 2:
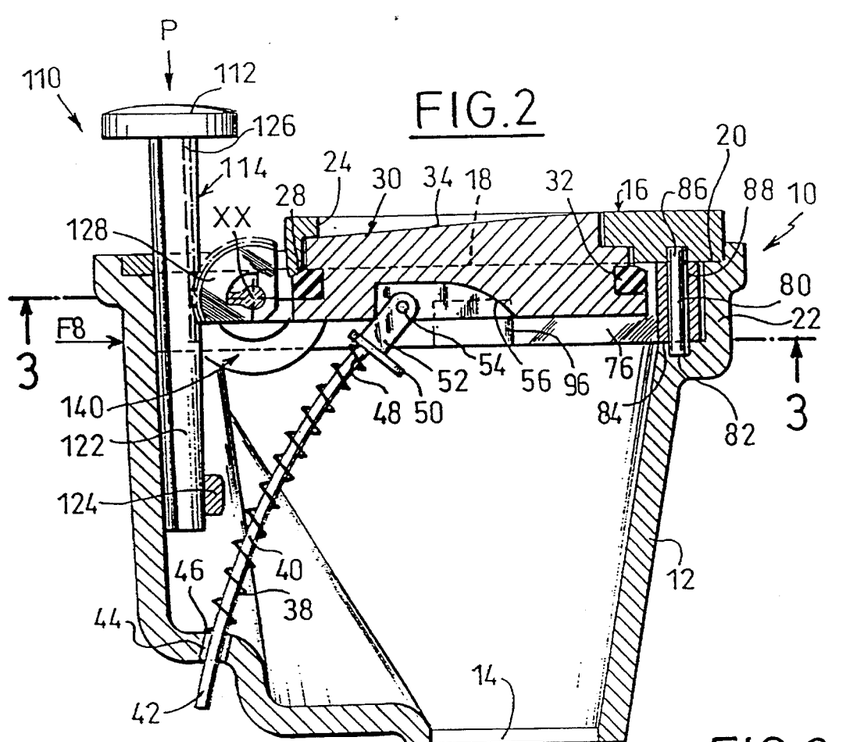
FIG. 2 is a view in cross section taken on the line 2—2 in FIG. 3, showing a filling head made in accordance with the invention.
Figure 4:
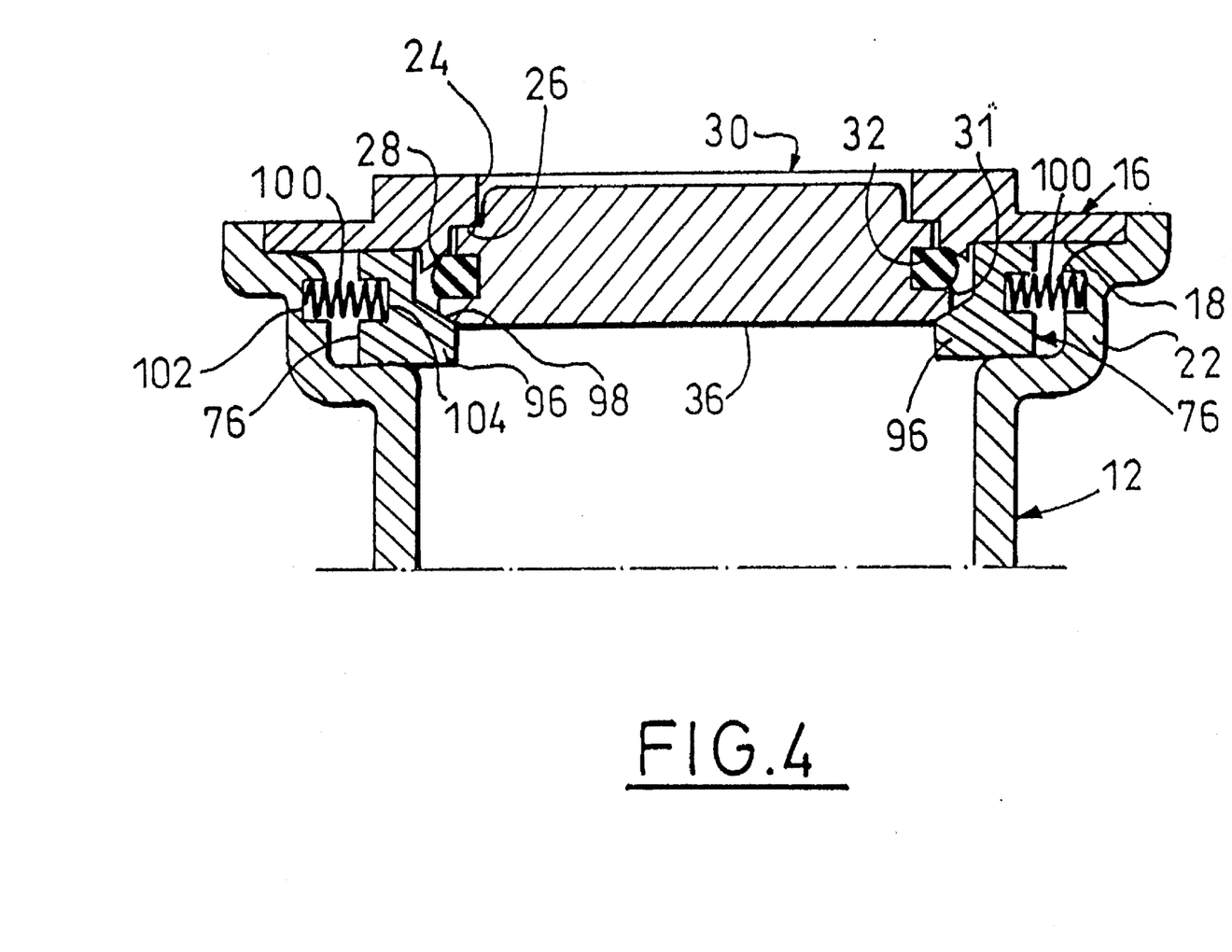
FIG. 4 is a view in cross section taken on the line 4—4 in FIG. 3, with the shut-off valve being shown in its closed and locked position in FIGS. 2 to 4.

The upper face 34 of the shut-off valve 30 is inclined, towards the left with reference to FIG. 2 and with respect to the plane of the lower face 36 (see FIG. 4). In the closed position, the lower face 36 is parallel to the plane of the lower face 18 of the cover. A helical compression spring 38, which is carried by a curved guide rod 40, biasses the flap valve 30 resiliently towards its closed or rest position, FIGS. 2 to 6.

The free end 42 of the guide rod 40 passes through a guide hole 44 which is formed close to the base of the bowl 12, and the lower end 46 of the spring 38 bears against the inner surface of the bowl around the guide hole 44.

The upper end 48 of the spring 38 bears against a thrust plate 50 of a pivot head 52. The guide rod 40 is articulated by means of the pivot head 52 on the lower face 36 of the shut-off valve 30. In this connection, the pivot head 52 is mounted pivotally about a pivot pin 54, and the lower face 36 of the shut-off valve is formed with a recess 56 to accommodate the pivot head 52 and to allow the latter to swing about its pivot pin 54.

The return spring 38 thus permanently urges the shut-off valve 30 in a rotational sense about the axis XX in the anti-clockwise direction with reference to FIG. 2, into the sealed, closed position in which the sealing gasket 32 is held against the conical seal seating 28.

Figure 3:
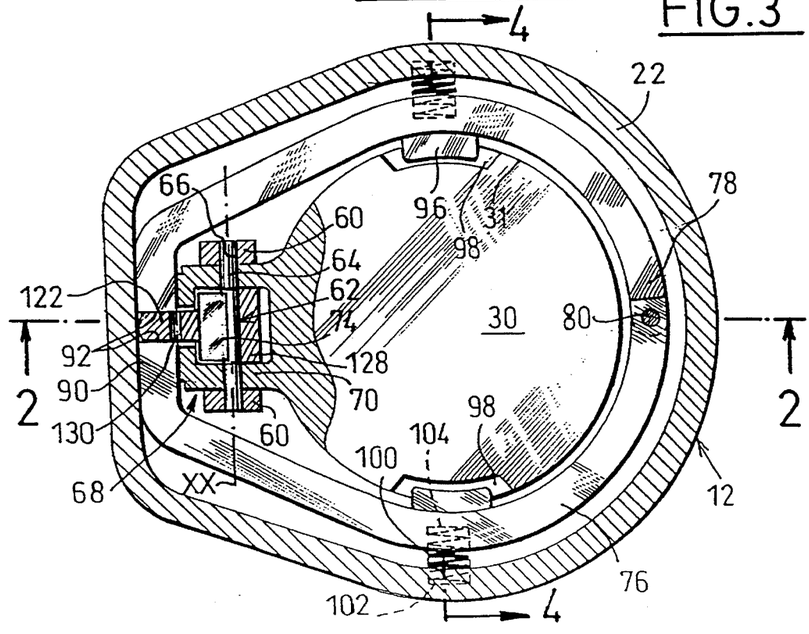
FIG. 3 is a view in cross section taken on the line 3—3 in FIG. 2.
Figure 11:
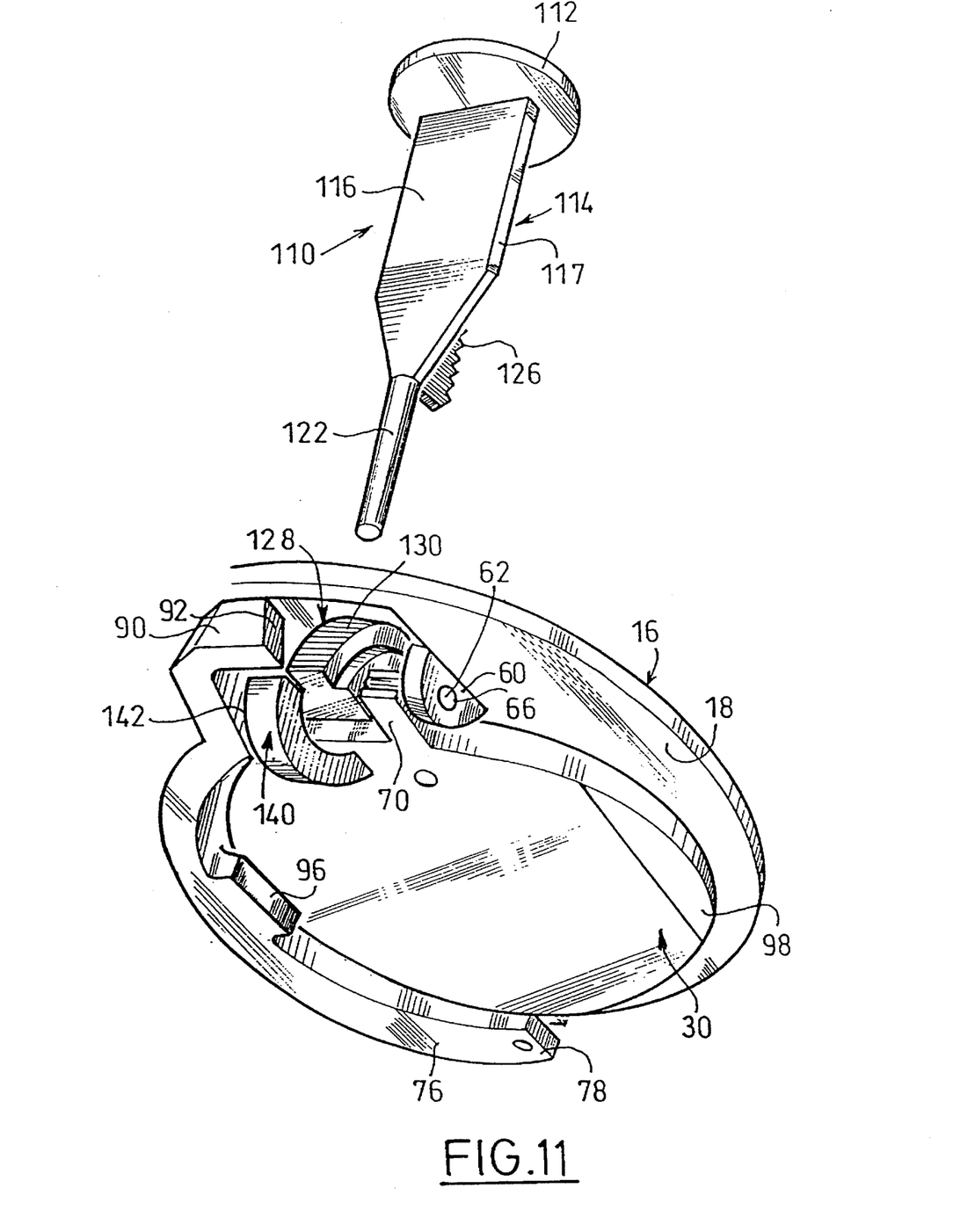
FIG. 11 is an exploded, perspective, partial view showing some of the components of the filling head, and in particular its cover, the shut-off valve, a locking arm, and the control plunger.
Figure 13:
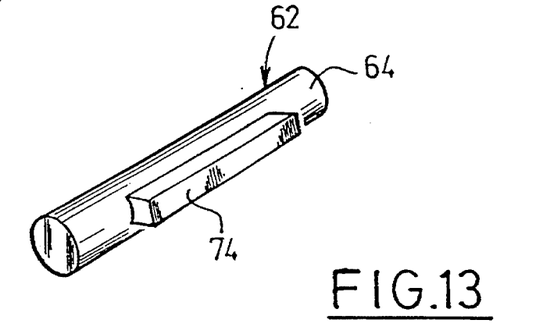
FIG. 13 is a perspective showing the pivot pin for the shut-off valve.
Figure 14:
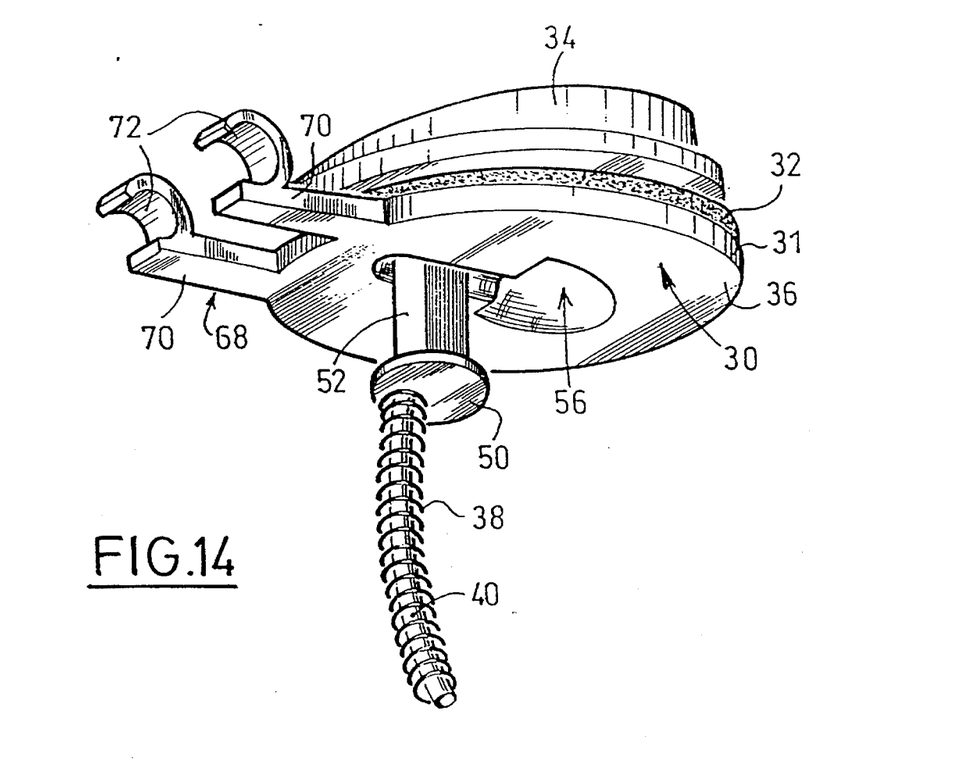
FIG. 14 is a perspective view showing the shut-off valve when equipped with some of its accessories.

As is best seen in FIG. 11 (to which reference is now also made), the lower face 18 of the cover 16 is formed with two projecting lugs 60, each of which has a hole 66 which receives a respective end of a pivot pin 62 by which the shut-off valve 30 is articulated on the cover 16. The pivot pin 62 is shown in FIG. 13, and has cylindrical end portions 64 which are rotatably mounted in the holes 66 formed in the lugs 60. As shown in FIG. 3, the cover 16 has a laterally projecting mounting portion 68 in which the pivot pin 62 is received. The latter is coupled to the cover for rotation with it by virtue of two parallel longitudinal fingers 70 (see especially FIG. 13), each of which is provided with an open pivot bearing 72, into which the ends 64 of the pivot pin can be introduced by being snap-fitted into these bearings 72. In this way the shut-off valve 30 is pivotable about the axis XX, and, in pivoting, it causes the pivot pin 62 to rotate. As is best seen in FIGS. 2, 3, 6, 7 and 13, the central portion of the pivot pin 62 has a radial drive lug 74, the particular function of which will be described below.

The locking means for the shut-off valve 30 in its closed position, and also the means for controlling these locking means, will now be described in detail. In this connection, the filling head has two locking arms 76, which are of generally curved shape as seen in FIG. 3. Each of these locking arms 76 surrounds the substantially circular lateral edge 31 of the shut-off valve 30, and lies in a plane which is parallel to the upper face of the filling head 10.

The first ends 78 of the locking arms 76 are pivoted about a further pivot pin 80, at right angles to the axis XX and in the top of the bowl 12. The lower end of the pivot pin 80 is received in a hole 82 formed in the peripheral wall 22 of the bowl 12, and more precisely in a seating face 84 defined inside the latter. The upper end 86 of the pivot pin 80 is received in a corresponding hole 88 formed in the lower face 18 of the cover 16. The other end, or second end 90, of each locking arm 76 is formed with a control surface in the form of an inclined ramp 92 (see especially FIGS. 8 to 10), with the two surpasses 92 being in facing relationship to each other. In its central portion 74, each locking arm 76 has a locking finger 96 which extends transversely, that is to say towards the general axis of the bowl 12 below the lower face 36 of the shut-off valve 30, when the latter is in its closed position seen in FIGS. 2 to 6. In this connection the lower face 36 of the valve may be formed with inclined recesses or flats 98, facing towards the locking fingers 96.

Each locking arm 76 is biassed resiliently towards its positive locking position seen in FIGS. 2 to 6, by means of a locking spring 100 which engages firstly in a complementary recess 102 defined by the inner wall of the bowl 12 in facing relationship with it, and secondly in a blind hole 104 which is formed in the middle portion of the arm 76.

Each locking spring 100 is a helical compression spring, which urges the locking fingers 76 inwardly towards each other and towards the centre of the bowl, so as also to urge the control ramps 92 correspondingly towards each other.

It will of course be understood that the two locking springs 100 may be replaced by a single leaf spring embracing the locking arms 76, with the ends of this leaf spring bearing against the recesses 102.

Figure 8:
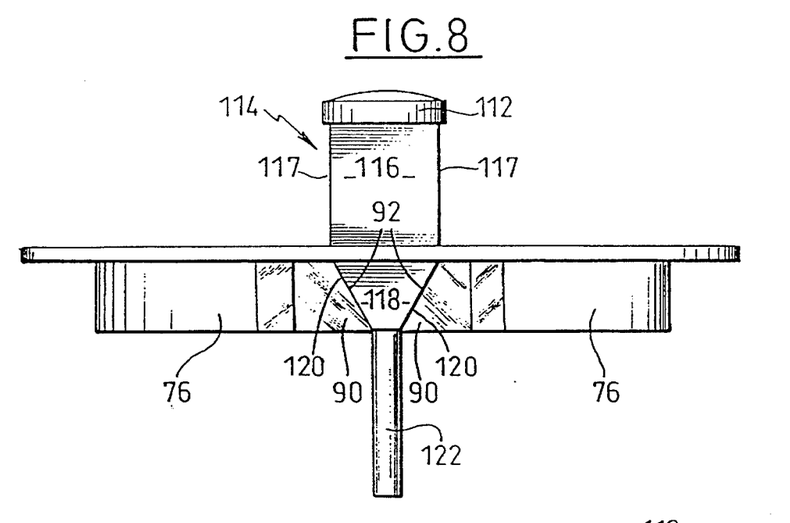
FIG. 8 is a detail view seen in the direction of the arrow F8 in FIG. 2, showing the relative position of the control plunger with respect to the control surfaces defined at the free ends of the locking arms.
Figure 9:
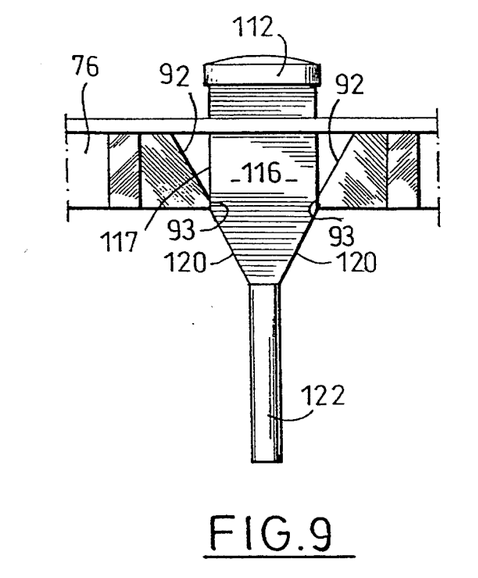
FIG. 9 is a view similar to FIG. 8 but relates to the situation shown in FIG. 5, FIG. 9 being seen in the direction of the arrow F9 in FIG. 5.
Figure 10:
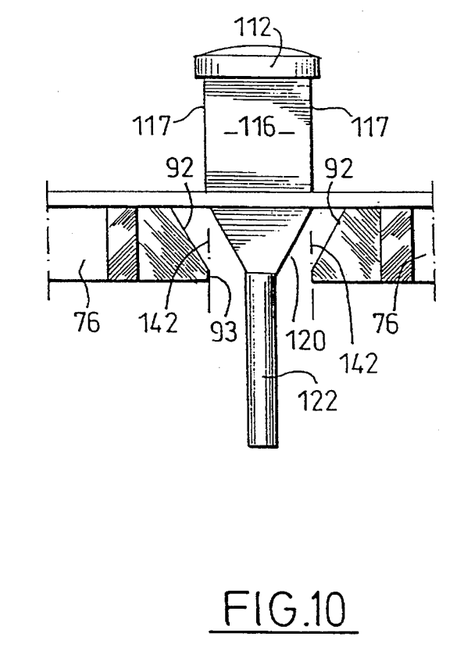
FIG. 10 is similar to FIGS. 8 and 9, but relates to the position shown in FIG. 7, being seen in the direction of the arrow F10 in FIG. 7.

The filling head includes a control plunger 110 (also referred to as a push button), which comprises a finger button 112 and a plunger body or rod 114. The control plunger 110 is best seen in FIGS. 8 to 10, and as is shown in these Figures the body 114 of the plunger comprises a wide upper portion 116 of rectangular section, a triangular middle portion 118, and a lower portion 122 in the form of a cylindrical guide rod. The triangular middle portion 118 defines two inclined, lateral control cams 120, the angle of inclination of which is identical with the angle of inclination of the control ramps 92 defined on the ends 90 of the locking arms 76.

The guide rod 122 is received in sliding relationship in a guide sleeve which is moulded integrally with the side wall of the bowl 12, in such a way that the control finger is able to slide in a vertical direction at right angles to the axis XX and parallel to the axis of the pivot pin 80 on which the locking arms 76 are pivoted. The control plunger 110 also has mating drive means which are arranged between the plunger 110 and the shut-off valve 30.

Figure 12:
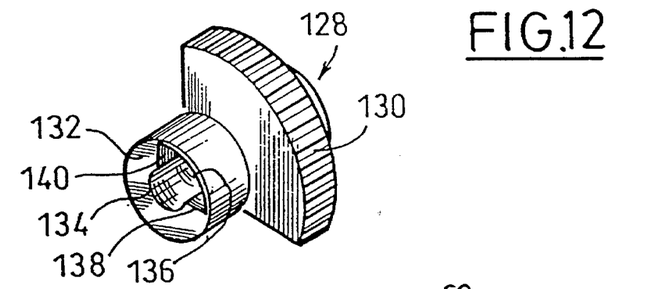
FIG. 12 is a perspective view of the toothed wheel, or pinion, for driving the control plunger.

In a first modified embodiment, the body 114 of the control plunger includes a drive rack 126 formed on that one of its inner faces which faces towards the axis XX. This rack 126 extends over the whole height of the plunger from the finger button 112 down to the top end of the guide rod 122. This embodiment is seen in FIGS. 1 to 6 and in FIG. 11. The teeth of the rack 126 cooperate with a drive pinion 128 which, in the form shown in FIG. 12, comprises a toothed sector 130 extending substantially over an arc of a circle of 90 degrees, and having a hub 136 which is formed with a bore 134, the diameter of which is complementary to the general diameter of the pivot pin 62. The hub 132 is also pierced with a recess 136 in the form of a hollow cylindrical sector, in which the drive lug 74 (FIG. 13) of the pivot pin 62 is received.

In this way, the drive pinion 128 is able to pivot about the axis of the pivot pin 62, and therefore about the axis XX, over a possible angular displacement between these two elements that extends over a sector subtending an angle substantially equal to 90 degrees, which is delimited by the radial faces 138 and 140 of the cylindrical recess 136. The teeth 130 of the drive pinion 128 are always in mesh with the teeth of the rack 126 of the control plunger 110. The drive pinion 128 and rack 126 thus constitute the drive means of the control plunger 110.

Finally, the lower face of each of the lugs 70 (FIG. 13) of the mounting portion 68 of the shut-off valve 30 has an abutment element 140, only one of which is shown in FIG. 11. Each of these abutment elements 140 has an outer side face 142 which, when the shut-off valve 30 is in its withdrawn position seen in FIG. 7, cooperates with the inner terminal end 93 of the associated control ramp 92 of a locking arm 76. See in this connection especially FIGS. 7 and 10.

The mode of operation of the filling head shown in the drawings will now be described. In the position seen in FIGS. 2 and 3, the shut-off valve 30 is in a closed and locked position, and the control plunger 110 is in its high position. When the user wishes to fill the fuel tank, using a filling nozzle in the usual way, he starts by unlocking the shut-off valve 30. For this purpose the user presses down on the finger button 112 of the control plunger 110 as indicated by the arrow P in FIG. 2. The effect of this pressure is to cause the control plunger 110 to slide downwardly (with respect to FIG. 2) until it occupies its low position shown in FIGS. 5 and 9.

Figure 5:
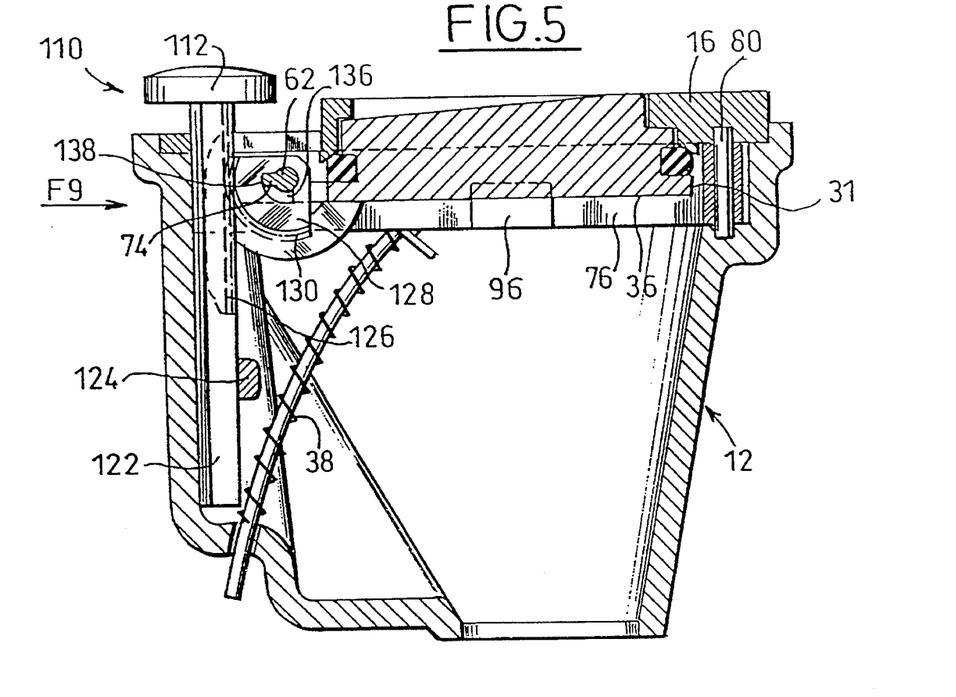
FIG. 5 is a view similar to FIG. 2, but shows the shut-off valve in a position in which it is closed but unlocked.
Figure 6:
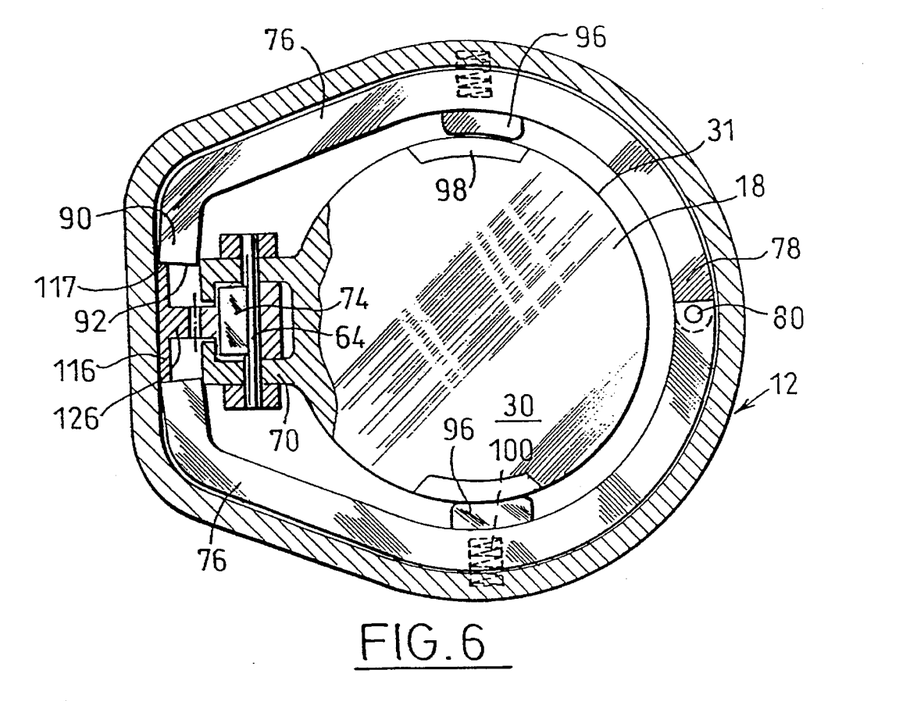
FIG. 6 is a view simillar to FIG. 3, but shows the shut-off valve in the same condition as in FIG. 5.

This sliding movement of the control plunger 110 from its high position to its low position forces the locking arms 76 apart into their unlocking position which is seen in FIGS. 5 and 6, by cooperation of the inclined control cams 120 with the control ramps 92. The locking arms are seen in their unlocked position in FIG. 9, in which the terminal edges 93 of the control ramps 92 are in abutment on the side edges 117 of the rectangular upper portion 116 of the plunger body 114. The locking fingers 96 are thus retracted with respect to the lower face 36 of the shut-off valve 30, so that the latter is free to pivot about the axis XX.

The downward movement of the control plunger 110 also causes the control pinion 128 to rotate through about 90 degrees with respect to the pivot pin 62 and its drive lug 74. The lug 74 is, from this point onwards, in engagement against the side face 138 of the recess 136.

Figure 7:
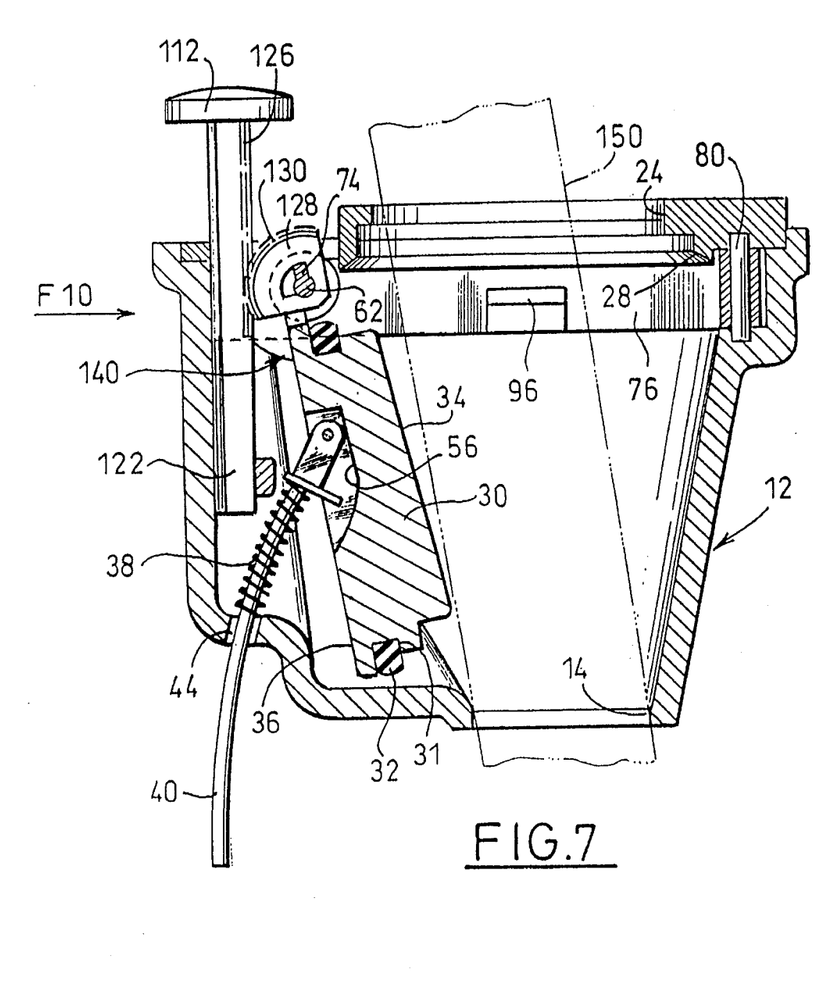
FIG. 7 is another view similar to FIG. 3, but shows the shut-off valve in an open position, in which it has been withdrawn into the interior of the filling head under the action of a fuel filling nozzle introduced into the filling head.

The filling nozzle, shown in phantom lines at 150 in FIG. 7, is now introduced. Introduction of the filling nozzle 150 brings the end of the latter into cooperation with the upper face 34 of the shut-off valve 30, thus causing the valve 30 to pivot about the axis XX in the clockwise direction as seen in the drawings. This pivoting action is against the force exerted by the return spring 38, and it also, at the same time, drives the control pinion 128 in rotation through the drive lug 74 formed on the pivot pin 62.

As the drive pinion 128 rotates, its teeth 130 cooperate with the rack 126 so as to raise the control plunger 110, from its low position shown in FIG. 5 to its high position shown in FIGS. 7 and 10.

The pivoting movement of the shut-off valve 30 also causes the side faces 142 of the abutment elements 140 arranged at the lower face 36 of the shut-off valve 30 to penetrate between the terminal edges 93 of the control ramps 92 of the locking arm 79, in such a way that these latter remain in their separated position corresponding to the unlocked state of the shut-off valve 30, even though the control plunger 110 has been raised to its high position. Therefore, filling of the fuel tank can continue so long as the filling nozzle 150 remains in the bowl 12. It will be noted that for filling purposes, the nozzle 150 extends through the bowl 12 and through the hole 14 in the base of the latter.

When filling is completed, the nozzle 150 is withdrawn from the bowl 12. Once this has taken place, the return spring 38 returns the shut-off valve 30 to its high, closed position, for which purpose the valve 30 pivots about the axis XX in the anti-clockwise direction, away from the position in which it is shown in FIG. 7. During this rotation, the control pinion 128 is not driven in rotation, and the control plunger 110 is not displaced, but, on the contrary, remains in its high position seen in FIG. 7.

When the valve 30 has completed its pivoting movement, the side faces 142 of the abutment elements 140 cease to lie between the terminal edges 93 of the control ramps 92 of the radial arm 76, so that the latter are then automatically returned by the locking springs 100 to their locking positions shown in FIGS. 2 and 3.

The automatic closing of the shut-off valve 30 thus, at the end of the closing operation, causes the shut-off valve to be locked automatically, this valve therefore being once again in its closed and locked position shown in particular in FIG. 2, with the control plunger 110 being also in its high position ready for the next filling operation. It is not possible for the shut-off valve 30 to open, even accidentally, without deliberate action on the control plunger 110.

The control plunger 110 is shown here in the form of a manually controllable plunger, but it is of course possible, without departing from the scope of the present invention, to design any appropriate type of remote control device or mechanism for the control plunger 110.

In addition, it will readily be understood that it is impossible for the shut-off valve 30 to remain in an unlocked but closed position, since it is the return of the latter into its upper, closed, position that automatically causes it to be locked into its closed position, without there being any need for the user to take any other positive action.

It will also be seen that a filling operation necessitates no manual action by the user on any kind of filler cap whatsoever, such as is usual in current practice. Such handling generally makes the user's hands dirty, besides being sometimes complicated to perform.

Locking of the shut-off valve 30 in its closed position is also completely independent of any security lock that may be provided for locking an outer flap or trap door that hides the filling head.

The force necessary in order to introduce the filling nozzle is also very small, because it is only the force exerted by the return spring 38 that needs to be overcome, the forces necessary for unlocking the shut-off valve 30 being independent of the introduction of the filling nozzle.

The present invention is of course not limited to the embodiments described above or shown in the drawings, but it embraces all modifications which the person skilled in the art may be able to apply to it. In particular, the actuating or drive means for the control plunger 110 may comprise a pin or spindle replacing the control pinion or toothed sector 128, this spindle being provided with a radial finger which is adapted to cooperate with a transverse groove formed in the lower portion 122 of the control plunger 110, without in any way departing from the scope of the invention.

What is claimed is:

1. A filler head for a motor vehicle fuel tank filling pipe, comprising a bowl-shaped body having an upper face defining a filling orifice, a shut-off flap valve, pivot means mounting the shut-off valve to the body, for pivoting movement of said valve between a rest position in which the valve closes the filling orifice and a withdrawn position in which it lies within said body and wherein the filling orifice is then open; first resilient means carried in said body and connected to the shut-off valve for biassing the latter towards said rest position, whereby introduction of a filling nozzle through the filling orifice moves the shut-off valve to its withdrawn position against the action of the first resilient means; and automatic locking means in the body, comprising an unlocking control member and means for coupling the unlocking control member with the shut-off valve whereby to lock the latter in its rest position, wherein: the shut-off valve defines a lower face thereof; the body defines a seating around the filling orifice whereby said first resilient means urges the shut-off valve into engagement against said seating; the locking means comprises: at least one locking finger; a portion of said lower face of the shut-off valve adapted for receiving said at least one locking finger; second resilient means for urging the latter into engagement with said portion of the lower face of the valve so as to define a locking position; and means for moving the locking finger or fingers from said locking position to an unlocking position in which the locking finger is, or fingers are, laterally retracted from said portion of the lower face of the flap valve; wherein the automatic locking means comprise a locking arm having a first end portion, a second end portion, and a middle portion joining said first and second end portions, the said middle portion having a said locking finger, second end portion defining a control surface, the shut-off valve having a side edge, said body having an upper face for surrounding said side edge of the shut-off valve in the rest position of the edge of the latter, the body defining a pivot axis at right angles to its said upper face, the filler head further comprising means articulating a first end portion of a pivot arm to the body for pivoting of the locking arm about said axis, with said control member defining a control cam cooperating with said control surface of the locking arm.

2. A filler head according to claim 1, wherein said control member is a control plunger having a side edge defining said control cam, said body having mounting means mounting the control plunger for sliding movement in the body in a direction at right angles to the upper face of the latter, between a high position for locking the shut-off valve and a low position for unlocking the shut-off valve.

3. A filler head according to claim 2, including coupling means for coupling said control plunger with the shut-off valve, the control plunger and said coupling means together defining drive means for displacement of the control plunger by mating cooperation.

4. A filler head according to claim 3, wherein the drive means comprise a rack carried by the control plunger and a drive pinion cooperating with said rack, and means connecting the drive pinion with the shut-off valve whereby the latter rotates the drive pinion while the valve is being opened.

5. A filler means according to claim 4, wherein the control plunger is adjacent to the pivot axis of the shut-off valve, the filling head including a pivot pin of the shut-off valve disposed on said axis and the drive pinion being mounted for rotation on said pivot pin, said coupling means further including means coupling the drive pinion and shut-off valve together in rotation and being such as to permit relative angular displacement between the drive pinion and shut-off valve.

6. A filler head according to claim 5, wherein said pivot pin is coupled to the valve for rotation with it and includes a radial coupling lug, the drive pinion defining a bore receiving said pivot pin and a recess defining a cylindrical sector extending over an angle that determines the value of said angular displacement between the drive pinion and shut-off valve, said recess being concentric with said bore and the radial coupling lug being received in the recess, said angle being substantially equal to the pivot angle between the rest position and the withdrawn position of the shut-off valve, whereby rotation of the drive pinion through said angle causes movement of the plunger between its said high and low positions.

7. A filler head according to claim 5, further including an abutment element in the lower face of the shut-off valve at right angles to the pivot axis of the shut-off valve, said abutment element having a side face cooperating with said control surface of the locking arm that carries the locking finger, whereby to maintain the latter in an unlocked position when the shut-off valve is in its withdrawn position with the control plunger in its high position.

\* \* \* \* \*

UNITED STATES PATENT AND TRADEMARK OFFICE
CERTIFICATE OF CORRECTION

PATENT NO. : 5,485,871
DATED : Jan. 23, 1996
INVENTOR(S) : Romanek, et al

It is certified that error appears in the above-indentified patent and that said Letters Patent is hereby corrected as shown below:

On cover page, item [54] in the title, "Filler Head For A Motor Vehicle Fuel Tank Filing Pipe" should read --Filler Head For A Motor Vehicle Fuel Tank Filling Pipe--

Item [73] Assignee: "Oaul Journee" should read --Paul Journee--.

Signed and Sealed this

Twenty-third Day of July, 1996

Attest:

BRUCE LEHMAN

*Attesting Officer*  *Commissioner of Patents and Trademarks*